(12) United States Patent
Hwang

(10) Patent No.: US 6,490,260 B1
(45) Date of Patent: Dec. 3, 2002

(54) TRANSMITTER WITH INCREASED TRAFFIC THROUGHPUT IN DIGITAL MOBILE TELECOMMUNICATION SYSTEM AND METHOD FOR OPERATING THE SAME

(75) Inventor: Seong-Kyu Hwang, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/128,236

(22) Filed: Aug. 3, 1998

(51) Int. Cl.$^7$ ................................................ H04B 7/216
(52) U.S. Cl. ...................... 370/335; 370/342; 714/758
(58) Field of Search ................................ 370/335, 342, 370/337, 347, 522, 527, 528; 714/746, 752, 758.1

(56) References Cited

U.S. PATENT DOCUMENTS

| | | | |
|---|---|---|---|
| RE33,900 E | | 4/1992 | Howson ..................... 370/514 |
| 5,511,073 A | | 4/1996 | Padovani et al. ........... 370/471 |
| 5,659,569 A | * | 8/1997 | Padovani et al. ........... 370/479 |
| 5,754,734 A | | 5/1998 | Emeott et al. .............. 704/226 |
| 5,768,276 A | | 6/1998 | Diachina et al. ........... 370/432 |
| 5,777,990 A | * | 7/1998 | Zehavi et al. ............... 370/335 |
| 5,878,045 A | * | 3/1999 | Timbs ......................... 370/328 |
| 5,909,434 A | * | 6/1999 | Odenwalder et al. ....... 370/342 |
| 6,205,190 B1 | * | 3/2001 | Antonio et al. ............. 370/318 |
| 6,285,682 B1 | * | 9/2001 | Proctor et al. .............. 370/465 |
| 6,289,037 B1 | * | 9/2001 | Gibbons et al. ............ 375/130 |

* cited by examiner

Primary Examiner—Chau Nguyen
Assistant Examiner—Soon-Dong Hyun
(74) Attorney, Agent, or Firm—Dilworth & Barrese, LLP

(57) ABSTRACT

A method for increasing information throughput in a transmitter of a digital mobile telecommunication system is provided. The method includes the step of implementing error correction with respect to a traffic channel frame having user service information to generate CRC bits for the user service information of the traffic channel frame. The CRC bits are inserted into a control channel frame. The traffic channel frame and the control channel frame having the inserted CRC bits are transmitted at a radio frequency.

13 Claims, 4 Drawing Sheets

TRANSMITTER WITH INCREASED TRAFFIC THROUGHPUT IN DIGITAL MOBILE TELECOMMUNICATION SYSTEM AND METHOD FOR OPERATING THE SAME

BACKGROUND OF THE INVENTION

1. Field of the Invention

The present invention relates to digital mobile telecommunication systems and, more particularly, to a transmitter with increased throughput of user information between a mobile telecommunication terminal and a base station.

2. Description of the Related Art

A Code Division Multiple Access (CDMA) system sets an n-bit random pattern (spread code) of "0s" and "1s" and transmits a message stream of that pattern and an inverted pattern at a bit rate n times the message bit rate. As the CDMA system transmits a message at the high bit rate, the width of the frequency spectrum is spread. Therefore, the CDMA system is sometimes referred to as a spread spectrum system.

A mobile telecommunication terminal, which is a subscriber or personal communication terminal, provides telecommunication services for the user by radio communication with a base station.

A conventional transmitter of the mobile telecommunication terminal and the base station in a typical CDMA system is illustrated in FIG. 1. The transmitter includes a voice encoder 10, a Cyclic Redundancy Check (CRC) encoder 12, a tail bit inserter 14, a Forward Error Correction (FEC) encoder 16, an interleaver 18, a symbol repeater 20, and a digital modulator 22.

In operation, voice or data information coded by voice encoder 10 is applied to CRC encoder 12 and tail bit inserter 14. The CRC encoder 12 CRC-encodes the applied voice or data information and adds the CRC-encoded result to the voice or data information. The tail bit inserter 14 inserts tail bits (fixed value bits) into the applied voice or data information. The CRC encoder 12 and tail bit inserter 14 perform the above operations in the time unit of a frame. The CRC-encoded result and the tail bits are added to the voice or data information to detect a transmission error of a traffic channel frame upon transmitting or receiving traffic channel data in the time unit of a frame.

Referring to FIG. 2, the structure of a traffic channel frame in which the CRC-encoded result and the tail bits are added to the voice or data information by CRC encoder 12 and tail bit inserter 14 is shown. The traffic channel frame is comprised of I data (voice) bits corresponding to the voice information generated by voice encoder 10, F CRC bits generated by CRC encoder 12 via a polynomial which uses the voice information bits, and T tail bits consisting of "0s".

For example, in an IS-95 system, a traffic channel frame of 9600 bps voice data is comprised of 192 bits during a frame of 20 ms in duration. The 192 bits are employed as follows: 172 voice information bits, 12 CRC bits, and 8 tail bits. A traffic channel frame of 4800 bps voice data is comprised of 96 bits during a frame of 20 ms. The 96 bits are employed as follows: 80 voice information bits, 8 CRC bits, and 8 tail bits.

The traffic channel frame illustrated in FIG. 2 is applied to an Radio Frequency (RF) transmitter after being processed by FEC encoder 16, interleaver 18, symbol repeater 20 and digital modulator 22, and carrier-modulated.

The FEC encoder 16 is a convolutional encoder for correcting a bit error in the receiver generated during radio transmission. The interleaver 18 is a block interleaver that performs interleaving to prevent a burst error which may be generated on a mobile telecommunication radio transmission channel. The symbol repeater 20 adjusts the symbol rate of the interleaved traffic channel frame. The digital modulator 22 consists of a direct sequence (DS) spread spectrum device, a data modulator, and a digital low pass filter for increasing the efficiency of a frequency band.

Meanwhile, the receiver receives the traffic channel frame and corrects an error through a digital demodulator, a de-interleaver, and a Viterbi decoder having a FEC decoding function. The error-corrected voice information is applied to a CRC encoder which is identical to that used in the transmitter. The receiver compares CRC bits obtained by the CRC encoder with CRC bits within the received traffic channel frame. If they are equal to each other, then no errors are considered to be present in the transmitted traffic channel frame. However, if they are not equal, then an error(s) is considered to be present in the traffic channel frame.

Thus, the CRC bits are inserted into the traffic channel frame together with the voice information in order to determine whether or not there are errors in the traffic channel frame. As such, the throughput of the voice information is decreased by a number of bits equal to the number of CRC bits. For instance, in the IS-95 system of 9600 bps voice data, since there are 12 CRC bits out of the total 192 bits during the frame time of 20 ms, the throughput of the voice information decreases by 6.25 percent (i.e., $12/192 \times 100$). Similarly, in the IS-95 system of 4800 bps voice data, the throughput of the voice information decreases by 8.33 percent (i.e., $8/96 \times 100$).

SUMMARY OF THE INVENTION

It is an object of the present invention to provide a transmitter for increasing the throughput of traffic information in a mobile communication system by transmitting CRC bits through a control channel frame.

It is another object of the present invention to provide a method for increasing the throughput of traffic information in a mobile communication system by transmitting CRC bits through a control channel frame.

In one aspect of the invention, a transmitter for increasing information throughput in a digital mobile telecommunication system is provided. The transmitter includes: means for implementing error correction with respect to a traffic channel frame having user service information to generate CRC bits for the user service information of the traffic channel frame; and means for inserting the CRC bits into a control channel frame, wherein the traffic channel frame and the control channel frame having the inserted CRC bits are transmitted at a radio frequency.

In another aspect of the invention, a method for increasing information throughput in a transmitter of a digital mobile telecommunication system is provided. The method includes the steps of: implementing error correction with respect to a traffic channel frame having user service information to generate CRC bits for the user service information of the traffic channel frame; and inserting the CRC bits into a control channel frame, wherein the traffic channel frame and the control channel frame having the inserted CRC bits are transmitted at a radio frequency.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Telecommunication technology has developed from CDMA digital mobile telecommunication systems which provide voice-based information services into future mobile telecommunication systems which provide radio multimedia services including moving pictures and data up to 2 Mbps. One such future mobile telecommunication system is the Future Public Land Mobile Telecommunication System (FPLMTS), which is also referred to as the International Mobile Telecommunication-2000 (IMT-2000).

To vary a user data rate and improve the quality of service according to user demands for various services of a mobile telecommunication system, a traffic channel frame is employed for transmitting user service information (voice, data, image, etc.) and a control channel frame associated with the user traffic channel frame is also employed. The control channel frame has the same frame time as the traffic channel frame. The control channel frame and the traffic channel frame are simultaneously transmitted. Although there may be differences according to the type of system employed and the services provided, the control channel frame generally includes a user information data rate corresponding to the traffic channel frame to be transmitted next, FEC and interleaver types and parameters, modulation types and parameters, handover related calculation values, etc. However, while the control channel frame contains a considerable amount of information and parameters in comparison to the traffic channel frame, its throughput is relatively small. As a result, the CRC bits which have been conventionally contained within the traffic channel frame are now contained within the control channel frame which is transmitted together with the traffic channel frame. By containing the CRC bits within the control channel frame in accordance with the present invention, the throughput of user traffic information can be increased.

Hereinafter, it is assumed that a mobile telecommunication system for providing voice, data and radio multimedia services is applied to a DS-CDMA system, and uses a traffic channel frame for transmitting the user service information and an independent control channel for transmitting control and signaling information.

Figure 1:
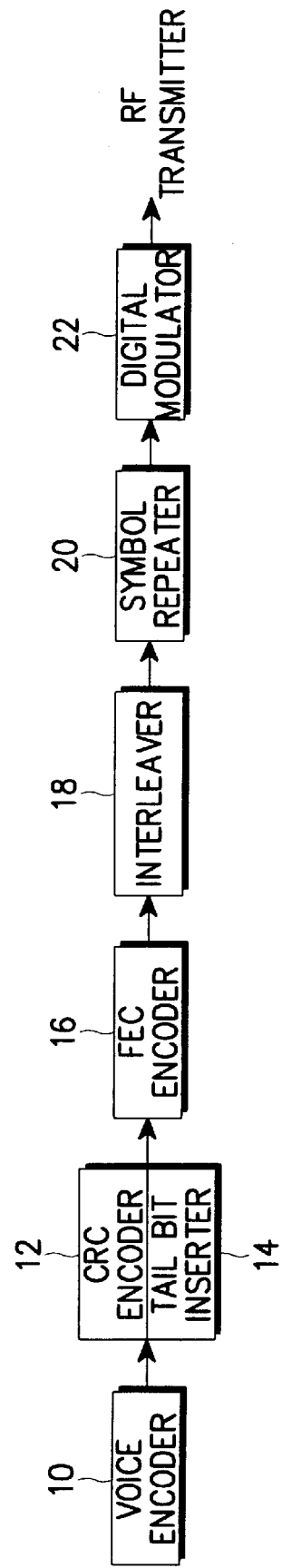
FIG. 1 is a block diagram of a conventional transmitter in a direct sequence code division multiple access (DS-CDMA) mobile telecommunication system.
Figure 2:
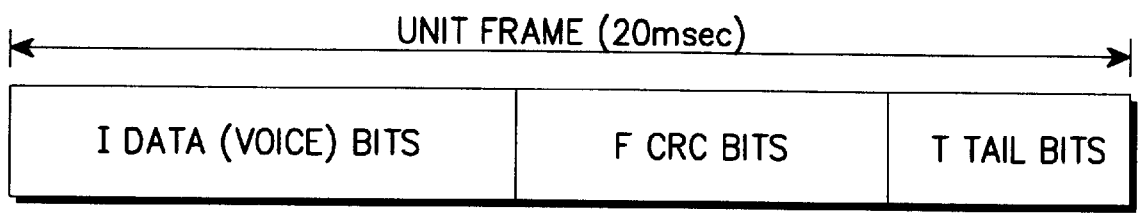
FIG. 2 is a diagram illustrating the structure of a traffic channel frame generated by the transmitter of FIG. 1.
Figure 3:
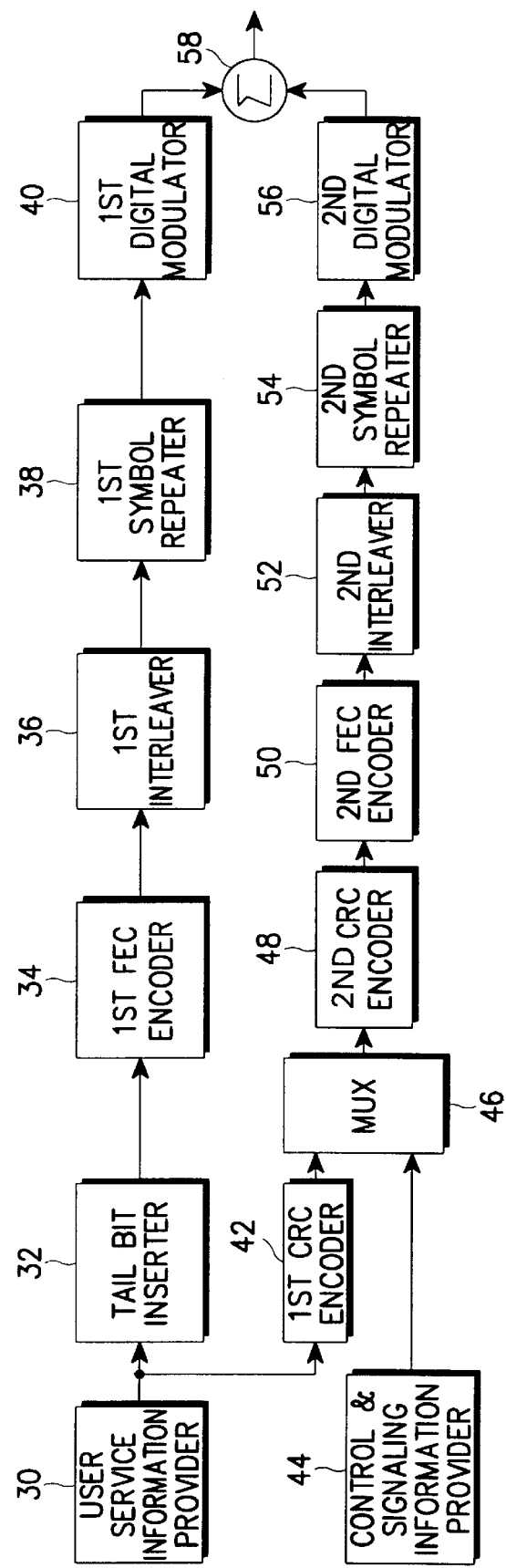
FIG. 3 is a block diagram of a transmitter in a DS-CDMA mobile telecommunication system according to a preferred embodiment of the present invention.
Figure 4:
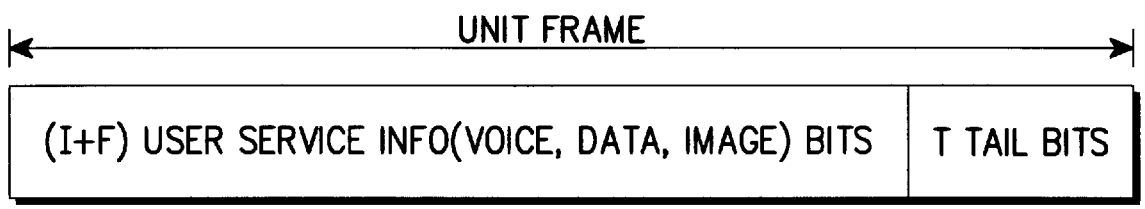
FIG. 4 is a diagram illustrating the structure of a traffic channel frame generated by the transmitter of FIG. 3.
Figure 5:
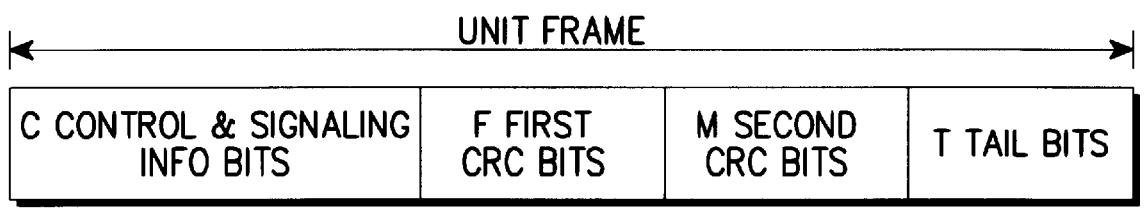
FIG. 5 is a diagram illustrating the structure of a control channel frame generated from the transmitter of FIG. 3.

Referring to FIG. 3, a block diagram of a transmitter in a direct sequence code division multiple access (DS-CDMA) mobile telecommunication system according to the present invention is shown. A user service information provider 30 generates information frames containing user service information such as, for example, voice, data, and image information. The time duration of an information frame generated from provider 30 is equal to a frame for the traffic channel. A tail bit inserter 32 inserts tail bits into the information frame supplied from user service information provider 30 and generates a traffic channel frame with a structure shown in FIG. 4. The traffic channel frame is comprised of (I+F) user service information bits and T tail bits. A first CRC encoder 42 generates first CRC bits used for detecting an error of the applied information frame. A control and signaling information provider 44 generates control and signaling information associated with traffic control as a control channel frame. A multiplexer (MUX) 46 multiplexes the first CRC bits generated by CRC encoder 42 with the control channel frame generated by control and signaling information provider 44. A second CRC encoder 48 generates second CRC bits for detecting an error of the control channel frame which has been multiplexed with the first CRC bits of the traffic channel. The second CRC encoder 48 inserts the second CRC bits into the control channel frame. The structure of the control channel frame generated by second CRC encoder 48 is shown in FIG. 5. The control channel frame is comprised of C control and signaling information bits, F first CRC bits, M second CRC bits, and T tail bits. A first FEC encoder 34 and a second FEC encoder 50 perform error correction coding for correcting a bit error generated on a radio communication channel with respect to the traffic channel frame and the control channel frame, respectively. A first interleaver 36 and a second interleaver 52 prevent a burst error in the traffic channel frame and the control channel frame, respectively. A first symbol repeater 38 and a second symbol repeater 54 equalize the symbol rate of a first digital modulator 40 corresponding to the traffic channel frame and a second digital modulator 56 corresponding to the control channel frame, respectively. The first and second digital modulators 40 and 56 implement DS spread spectrum modulation and data modulation. A digital adder 58 adds the traffic channel frame generated by first digital modulator 40 to the control channel frame generated by second digital modulator 56 in order to simultaneously transmit the traffic and control channel frames.

In operation, the traffic channel frame, which contains information such as voice, data, and image information, is simultaneously supplied to tail bit inserter 32 and first CRC encoder 42 from user service information provider 30 in the time unit of a frame. The tail bits are inserted into the traffic channel frame applied to tail bit inserter 32. The structure of the traffic channel frame generated by tail bit inserter 32 is shown in FIG. 4. The traffic channel frame consists of the user service information bits which correspond to the time unit of a frame defined by the user service data rate and the system, and the tail bits associated with the FEC encoder used in the system. The number of tail bits is T. Assuming that for the traffic channel a frame is 20 ms in duration (as in the case of IS-95) and also, that the same CRC encoder is used, F CRC bits are transmitted using the control channel frame. Therefore, in the structure of the traffic channel frame according to the present invention, F service information bits can be further transmitted.

The traffic channel frame generated by tail bit inserter 32 is coded by first FEC encoder 34 to correct a bit error which may be generated on the radio transmission channel and applied to the first interleaver 36. The traffic channel frame is interleaved by first interleaver 36 to prevent a burst error, and is then applied to first symbol repeater 38 which equalizes the symbol rate of first digital modulator 40 by repeating symbols. The traffic channel frame generated by first symbol repeater 38 is applied to first digital modulator 40 to perform DS spread spectrum modulation and data modulation. The output of first digital modulator 40 is applied to digital adder 58.

On the other hand, the traffic channel frame is applied to first CRC encoder 42, and the first CRC bits for the user service information are generated therefrom. The control channel frame having the control and signaling information is generated by control and signaling information provider 44. The first CRC bits are CRC bits for the traffic channel information. The first CRC bits and the control channel frame are supplied to MUX 46 and multiplexed with each other. The resultant control channel frame generated by MUX 46 is applied to second CRC encoder 48 and the second CRC bits are added thereto, thereby generating the control channel frame with the structure illustrated in FIG. 5. The second CRC bits are CRC bits for the control and signaling information bits and the first CRC bits.

In the structure of the control channel frame, the control and signaling information bits consist of C bits of a user service information data rate corresponding to the traffic channel frame to be transmitted next, FEC and interleaver types and parameters, modulation types and parameters, handover related calculation values and parameters, etc.

The control channel frame generated by second CRC encoder 48 is applied to digital adder 58 after processing by FEC encoder 50, interleaver 52, symbol repeater 52 and digital modulator 54 in the same manner as described above with respect to the traffic channel frame. However, the number of repeated symbols in second symbol repeater 54 is greater than that in first symbol repeater 38. This is because the number of control and signaling information bits of the control channel frame is less than the number of user service information bits of the traffic channel frame during the same frame time. Therefore, the symbols of the control channel frame can be repeated more than the symbols of the traffic channel frame.

The traffic channel frame and the control channel frame generated by first and second digital modulators 40 and 56, respectively, are added to each other by digital adder 58. The added traffic channel frame and control channel frame are RF-modulated and transmitted through a digital-to-analog converter, an RF transmitter and an antenna.

As described above, the CRC bits for detecting an error in the user service information are transmitted using a physically independent control channel frame instead of a traffic channel frame. Therefore, the throughput of user service information can be increased by a number of bits equal to the CRC bits which have been eliminated from the traffic channel frame. Since the data rate of the control channel frame is relatively smaller than the data rate of the traffic channel frame during the same frame time, the number of repeated symbols of the control channel frame can be increased. An increase in the number of repeated symbols in the mobile telecommunication system lessens the likelihood of an error being generated on the radio transmission channel. Hence, the CRC bits transmitted by the control channel frame have a lower probability of generating an error than those transmitted by the traffic channel frame of the prior art. Further, since the probability of an error being generated in the control channel frame is very low, the use of the (first) CRC bits transmitted in the control channel frame to detect an error of the traffic channel frame results in increased accuracy in the detection of errors of the traffic channel frame. Thus, by accurately detecting an error of the traffic channel frame, the present invention may be used to increase the quality of the services provided by a mobile telecommunication system.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A transmitter in a digital mobile telecommunication system, comprising:
    a first Cyclic Redundancy Check (CRC) generator for generating first CRC bits of a traffic channel frame having a user service information;
    a second CRC generator for generating second CRC bits for a multiplexed data of the first CRC bits and a control channel frame having signaling information; and
    a second encoder for encoding the multiplexed data;
    wherein the control channel frame is associated with the traffic channel frame.

2. The transmitter of claim 1, further comprising means for inserting tail bits in the traffic channel frame.

3. The transmitter of claim 1, further comprising means for interleaving the traffic channel frame and the control channel frame, respectively.

4. The transmitter of claim 1, further comprising means for modulating the traffic channel frame and the control channel frame, respectively.

5. A transmitter for increasing information throughput in a digital mobile telecommunication system, comprising:
    a user service information provider for generating a traffic channel frame having user service information in a unit of a traffic channel frame time;
    a tail bit inserter coupled to said user service information provider for inserting tail bits into the traffic channel frame;
    a first CRC (Cyclic Redundancy Check) encoder coupled to said user service information provider for generating first CRC bits and CRC encoding the user service information of the traffic channel frame generated by said user service information provider with the first CRC bits;
    a control and signaling information provider for generating a control channel frame having control and signaling information;
    a multiplexer coupled to said first CRC encoder and said control and signaling information provider for outputting the control channel frame multiplexed with the first CRC bits;
    a second CRC encoder coupled to said multiplexer for generating second CRC bits and CRC encoding the multiplexed control channel frame outputted by said multiplexer with the second CRC bits;
    a first and a second Forward Error Correction (FEC) encoder coupled to said tail bit inserter and said second CRC encoder, respectively, for correcting a bit error associated with a traffic channel frame and a control channel frame outputted from said tail bit inserter and said second CRC encoder, respectively;
    a first and a second interleaver coupled to said first and second FEC encoders, respectively, for preventing a burst error associated with a traffic channel frame and a control channel frame outputted from said first and second FEC encoders, respectively;
    a first and a second symbol repeater coupled to said first and second interleavers, respectively, for repeating symbols associated with a traffic channel frame and a control channel frame outputted from said first and second interleavers, respectively;

a first and a second digital modulator coupled to said first and second symbol repeaters, respectively, for modulating a traffic channel frame and a control channel frame outputted from said first and second symbol repeaters, respectively; and a digital adder for adding a traffic channel frame outputted from said first digital modulator to a control channel frame outputted from said second digital modulator.

6. The transmitter of claim 5, wherein said first and second digital modulators implement direct sequence spread spectrum modulation and data modulation with respect to the traffic channel frame and the control channel frame generated by said first and second symbol repeaters, respectively.

7. A method of transmitting user service information and signaling information in a digital mobile telecommunication system, comprising the steps of:

generating first Cyclic Redundancy Check (CRC) bits for a traffic channel frame having user service information;

first encoding the user service information for forward error correcting;

generating second CRC bits for multiplexed data of the first CRC bits and a control channel frame having signaling information;

second encoding the multiplexed data for forward error correcting; and transmitting through an RF transmitter and an antenna.

8. The method of claim 7, wherein the control channel frame is associated with the traffic channel frame.

9. The method of claim 7, further comprising the step of inserting tail bits in the traffic channel frame.

10. The method of claim 7, further comprising the step of interleaving the traffic channel frame and the control channel frame, respectively.

11. The method of claim 7, further comprising the step of modulating the traffic channel frame and the control channel frame, respectively.

12. A method for increasing information throughput in a transmitter of a digital mobile telecommunication system, comprising the steps of:

generating a traffic channel frame by inserting tail bits into user service information generated at a time unit of a frame;

inserting first Cyclic Redundancy Check (CRC) bits into control and signaling information by generating the first CRC bits relative to the traffic channel frame;

generating second CRC bits relative to the first CRC bits and the control and signaling information;

generating a control channel frame by inserting the second CRC bits into the control and signaling information together with tail bits; and adding the control channel frame to the traffic channel frame and radio-transmitting the added result.

13. A method for increasing information throughput in a transmitter of a digital mobile telecommunication system, comprising the steps of:

inserting tail bits into a first traffic channel frame having user service information to generate a second traffic channel frame;

generating first Cyclic Redundancy Check (CRC) bits for the user service information of the first traffic channel frame;

inserting the first CRC bits into a first control channel frame to generate a second control frame;

generating second CRC bits for the second control frame;

inserting the second CRC bits into the second control frame to generate a third control frame;

implementing forward error correction to the second traffic channel frame and the third control channel frame to generate a third traffic channel frame and a fourth control channel frame, respectively;

interleaving the third traffic channel frame and the fourth control channel frame to prevent a burst error in the third traffic channel frame and the fourth control channel frame, respectively, and to generate a fourth traffic channel frame and a fifth control channel frame, respectively;

equalizing a symbol rate of a digital modulator by repeating symbols for the fourth traffic channel frame and the fifth control channel frame to generate a fifth traffic channel frame and a sixth control channel frame;

implementing direct sequence spread spectrum modulation and data modulation for the fifth traffic channel frame and the sixth control channel frame to generate a sixth traffic channel frame and a seventh control channel frame; and adding the sixth traffic channel frame to the seventh control channel frame.

* * * * *

UNITED STATES PATENT AND TRADEMARK OFFICE
CERTIFICATE OF CORRECTION

PATENT NO.   : 6,490,260 B1
DATED        : December 3, 2002
INVENTOR(S)  : Seong-Kyu Hwang It is certified that error appears in the above-identified patent and that said Letters Patent is hereby corrected as shown below:

<u>Title page,</u>
Item [30], Foreign Application Priority Data, should read as follows:
-- Aug. 2, 1997  [KR]  Republic of Korea ….. 1997-37100 --

Signed and Sealed this

Twenty-ninth Day of April, 2003

JAMES E. ROGAN
*Director of the United States Patent and Trademark Office*